United States Patent
Mouatadid et al.

(10) Patent No.: US 11,531,527 B1
(45) Date of Patent: Dec. 20, 2022

(54) STORAGE STRUCTURE FOR PATTERN MINING

(71) Applicant: Intuit Inc., Mountain View, CA (US)

(72) Inventors: Lalla Mouatadid, Ontario (CA); Jay Jie-Bing Yu, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/488,648

(22) Filed: Sep. 29, 2021

(51) Int. Cl.
    *G06F 9/44* (2018.01)
    *G06F 8/41* (2018.01)
    *G06F 8/36* (2018.01)
    *G06F 8/72* (2018.01)

(52) U.S. Cl.
    CPC .............. *G06F 8/4435* (2013.01); *G06F 8/36* (2013.01); *G06F 8/72* (2013.01)

(58) Field of Classification Search
    None
    See application file for complete search history.

(56) References Cited

U.S. PATENT DOCUMENTS

| | | | |
|---|---|---|---|
| 2007/0021995 A1* | 1/2007 | Toklu | G06F 8/10 705/7.27 |
| 2014/0278590 A1* | 9/2014 | Abbassi | G06F 16/9024 705/5 |
| 2017/0228448 A1* | 8/2017 | Fan | G06Q 50/01 |
| 2018/0067941 A1* | 3/2018 | Chambers | G06F 16/211 |

OTHER PUBLICATIONS

Yu, J., et al., "Tax Knowledge Graph for a Smarter and More Personalized Turbo Tax", International Workshop on Knowledge Graph, Aug. 1, 2020, 6 pages.

* cited by examiner

*Primary Examiner* — Qamrun Nahar
(74) *Attorney, Agent, or Firm* — Ferguson Braswell Fraser Kubasta PC

(57) ABSTRACT

A computer implemented method includes obtaining an original graph data structure including multiple stored nodes connected by multiple edges. The stored nodes include multiple operation stored nodes and multiple data stored nodes. The method further includes generating an auxiliary graph data structure from the original graph data structure. The auxiliary graph data structure includes the operation stored nodes. The method further includes executing a pattern mining tool on the auxiliary graph data structure to obtain a pattern list, traversing the auxiliary graph data structure to identify multiple instances of identified patterns in the pattern list, and presenting the instances.

20 Claims, 11 Drawing Sheets

Part B – Alberta tax on taxable income

Enter your taxable income from line 26000 of your return.

Use the amount from line 38 to decide which column to complete.

| | Line 38 is $131,220 or less | Line 38 is more than $131,220 but not more than $157,464 | Line 38 is more than $157,464 but not more than $209,952 | Line 38 is more than $209,952 but not more than $314,928 | Line 38 is more than $314,928 |
|---|---|---|---|---|---|
| Amount from line 38 | | | | | 38 |
| Line 39 minus line 40 (cannot be negative) | 0 00 = | 131,220 00 = | 157,464 00 = | 209,952 00 = | 314,928 00 = 39 40 |
| Multiply line 41 by line 42. | × 10% = | × 12% = | × 13% = | × 14% = | × 15% = 41 42 |
| Add lines 43 and 44. | + 0 00 = | + 13,122 00 = | + 16,271 00 = | + 23,095 00 = | + 37,791 00 = 43 44 |
| Alberta tax on taxable income | | | | | 45 |
| | 802 | 804 | 806 | 808 | 810 |

Part B – British Columbia tax on taxable income

Enter your taxable income from line 26000 of your return. _____ 41

Use the amount from line 41 to decide which column to complete.

| | Line 41 is $40,707 or less. | Line 41 is more than $40,707 but not more than $81,416 | Line 41 is more than $81,416 but not more than $93,476 | Line 41 is more than $93,476 but not more than $113,506 | Line 41 is more than $113,506 but not more than $153,900 | Line 41 is more than $153,900 |
|---|---|---|---|---|---|---|
| Amount from line 41 | | | | | | 42 |
| Line 42 minus line 43 (cannot be negative) | − 0.00 | − 40,707.00 | − 81,416.00 | − 93,476.00 | − 113,506.00 | − 153,900.00 43 |
| | = | = | = | = | = | = 44 |
| Multiply line 44 by line 45. | × 5.06% | × 7.7% | × 10.5% | × 12.29% | × 14.7% | × 16.8% 45 |
| | = | = | = | = | = | = 46 |
| Add lines 46 and 47. | + 0.00 | + 2,060.00 | + 5,195.00 | + 6,461.00 | + 8,923.00 | + 14,861.00 47 |
| British Columbia tax on taxable income | = | = | = | = | = | = 48 |

Continue on the next page.

*FIG. 10*

STORAGE STRUCTURE FOR PATTERN MINING

BACKGROUND

Redundant code sections in software applications is problematic from the standpoint of maintenance, detecting security vulnerabilities, storage, optimization, and processing power. For example, code may be updated to add or change functionality of the code, optimize the code for better storage and faster execution, fix security vulnerabilities, and for other reasons. As another example, outdated code sections should be removed. However, when redundant code sections exist, modifications made to one redundant section should often also be propagated to remaining sections. Software applications can have hundreds of thousands of lines of code with large development teams performing modifications.

To address redundant code, pattern matching may be performed on a graph data structure of the code. The graph data structure has separate nodes for each input, each output, and each operation in the software application along with links between operations. Pattern matching on such a graph is, however, an NP-Complete problem. Accordingly, computer processors cannot process within reasonable time limits pattern matching on large software applications, or large sections thereof.

SUMMARY

In general, in one aspect, one or more embodiments relate to a computer implemented method that includes obtaining an original graph data structure including multiple stored nodes connected by multiple edges. The stored nodes include multiple operation stored nodes and multiple data stored nodes. The method further includes generating an auxiliary graph data structure from the original graph data structure. Generating the auxiliary graph data structure includes adding, from the original graph data structure, the operation stored nodes to the auxiliary graph data structure while traversing the original graph data structure, and replacing, when adding the operation stored nodes, a data stored node and at least two edges connecting the data stored node to at least two operation stored nodes with at least one new edge. The method further includes executing a pattern mining tool on the auxiliary graph data structure to obtain a pattern list, traversing the auxiliary graph data structure to identify multiple instances of identified patterns in the pattern list, and presenting the instances.

In general, in one aspect, one or more embodiments relate to a system including a storage device storing an original graph data structure including multiple stored nodes connected by multiple original graph edges, whereby the stored nodes including multiple operation stored nodes and multiple data stored nodes, and an auxiliary graph data structure including the operation stored nodes labeled with an operation type and connected by multiple auxiliary graph edges, where the auxiliary graph edges each labeled with a datatype identifier of corresponding data stored node of data stored nodes. The system further includes at least one computer processor executing a code optimization application, the code optimization application including a graph transformation tool configured to generate the auxiliary graph data structure from the original graph data structure.

In general, in one aspect, one or more embodiments relate to a computer implemented method including generating an auxiliary graph data structure from an original graph data structure. The original graph data structure includes multiple stored nodes connected by multiple original graph edges, stored nodes including multiple operation stored nodes and multiple data stored nodes, and the auxiliary graph data structure includes operation stored nodes labeled with an operation type and connected by multiple auxiliary graph edges. The auxiliary graph edges are each labeled with a datatype identifier of corresponding data stored node of data stored nodes. The method further includes executing a pattern mining tool on the auxiliary graph data structure to obtain a pattern list, identifying multiple instances of identified patterns in the pattern list, and presenting the instances.

Other aspects of the invention will be apparent from the following description and the appended claims.

BRIEF DESCRIPTION OF DRAWINGS

FIGS. 8, 9, 10, 11, 12, and 13 show an example in accordance with one or more embodiments.

DETAILED DESCRIPTION

Figure 1:
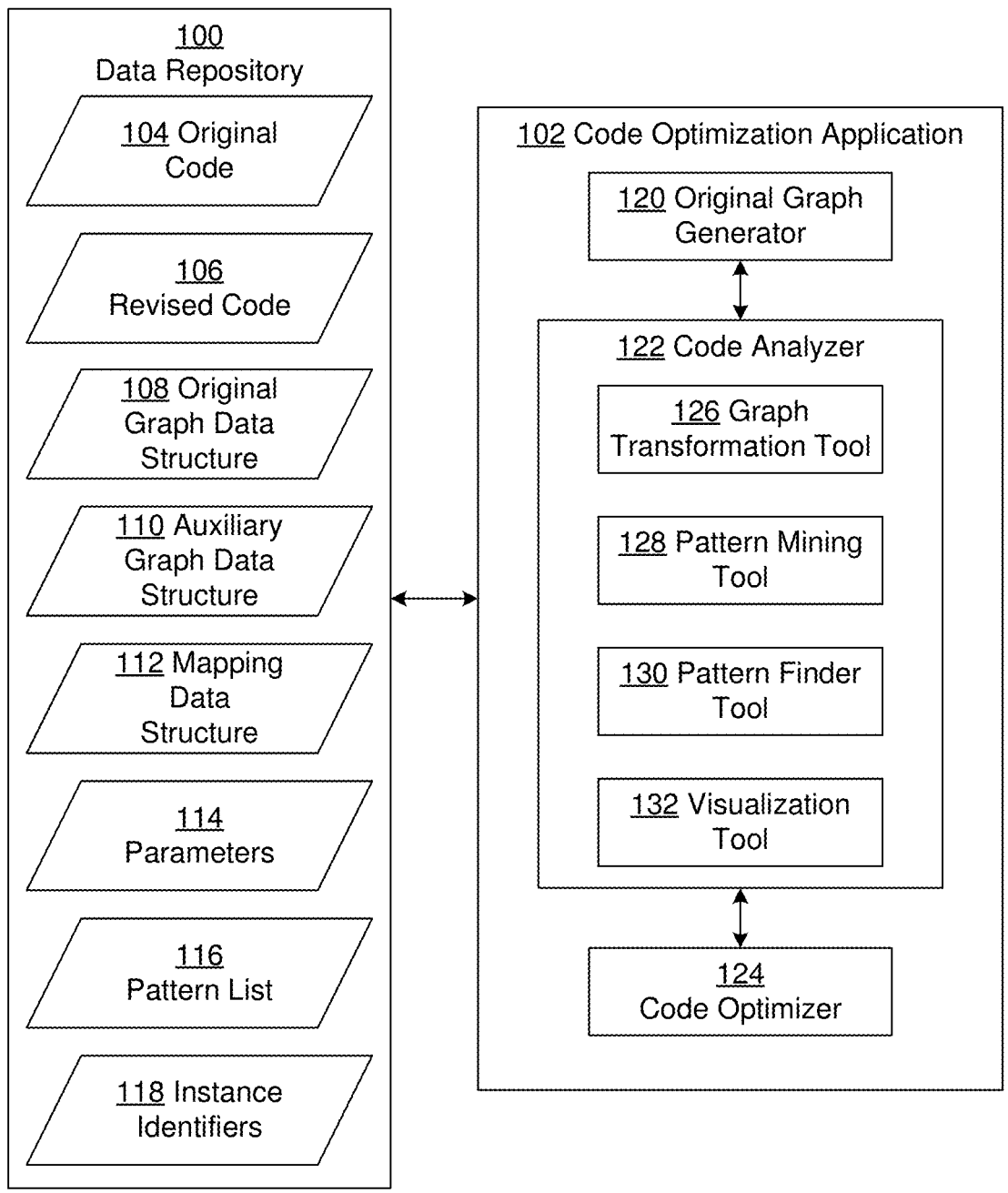
FIG. 1 shows a diagram of a system in accordance with one or more embodiments.

Specific embodiments of the invention will now be described in detail with reference to the accompanying figures. Like elements in the various figures are denoted by like reference numerals for consistency.

In general, embodiments of the invention are directed to a storage structure for pattern mining on code of a software application. The storage structure is an auxiliary graph data structure that is auxiliary to an original graph data structure representing a software application, or portion thereof. The original graph data structure has stored nodes that include operation stored nodes and data stored nodes. The various stored nodes are connected by edges. Specifically, each operation stored node represents an operation in the code. The operation stored nodes are connected, by respective edges, to data stored nodes. The various operation stored nodes and data stored nodes may also be connected to operation type stored nodes and data type stored nodes representing the operation type and data type, respectively. From the original graph data structure, the auxiliary graph data structure is generated. The auxiliary graph data structure has the operation stored nodes and edges directly connecting the operation stored nodes. The edges are labeled with the data type of the data stored nodes that were in between corresponding operation stored nodes.

By transforming the original graph data structure into the auxiliary graph data structure, the number of nodes is greatly reduced while maintaining sufficient information to identify patterns in the code. Accordingly, a pattern mining tool is then executed on the auxiliary graph data structure to obtain a pattern list that lists identified patterns in the auxiliary graph data structure. From the identified patterns, the instances of the patterns may be found in the auxiliary graph data structure, and correspondingly the original graph data structure and the code. The instances of the patterns are the copies of the patterns in the code.

Turning now to the figures, FIG. 1 shows a diagram of a system in accordance with one or more embodiments. As shown in FIG. 1, the system includes a data repository (100) operatively connected to a code optimization application (102).

The data repository (100) is any type of storage unit or device (e.g., a file system, database, collection of tables, or any other storage mechanism or combination thereof) for storing data. The data in the data repository (100) includes original code (104), revised code (106), an original graph data structure (108), an auxiliary graph data structure (110), a mapping data structure (112), parameters (114), a pattern list (116), and instance identifiers (118). Each of these components is described below.

In general, code (e.g., original code (104), revised code (106)) is any computer executable instructions in virtually any language. For example, code may be a series of stored calculations that are calculated by a computer, such as instructions in a spreadsheet or group of spreadsheets. As another example, the code may be scripting language, object-oriented language, procedural based code, or other such code. Original code (104) is a version of the code prior to executing one or more embodiments disclosed herein. Revised code (106) is code that is revised based on identified patterns in the code. The original code (104) may have redundancies, whereby the redundancies are multiple instances of a pattern of operations of the code that produces the same output type between operations and at the end of the operations. For example, while the underlying variables that are inputs and outputs of the operations may change, the datatypes of the inputs and outputs as well as the operation types and the order is the same for each instance of a pattern. Revised code (106) is code that is revised based on the redundancies. For example, revised code (106) may have the instances of a same pattern replaced by a function code to a single function.

An original graph data structure (108) is a data structure that represents the original code (104). The original graph data structure (108) has stored nodes and edges. A stored node is a data object that is stored in memory. The edges are stored relationships between the stored nodes. The edges of the original graph are referred to as original graph edges. In one or more embodiments, the original graph data structure (108) is a directed, acyclic graph.

Figure 2:
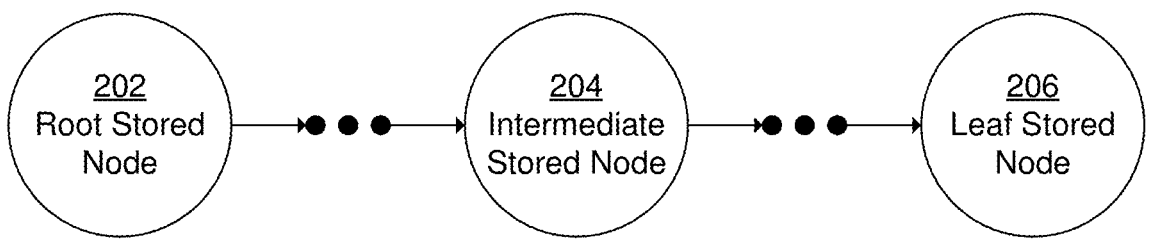
FIG. 2 shows a general diagram of an original graph data structure in accordance with one or more embodiments.

Turning to FIG. 2, as a directed, acyclic graph, the original graph data structure (108) includes one or more root stored nodes (202), connected to one or more intermediate stored nodes (204), which are connected to one or more leaf stored nodes (206). The root stored nodes (202) are stored nodes that do not have an edge leading from another stored node to the root stored node. The leaf stored nodes (206) are stored nodes that do not have an edge leading from the leaf stored node to another stored node. Intermediate stored nodes in a graph data structure have an edge to the intermediate stored node from another stored node as well as an edge from the intermediate stored node to another stored node. As shown by the three collinear dots, any number of intermediate stored nodes, root stored nodes, and leaf stored nodes may exist in the graph data structure.

Figure 3:
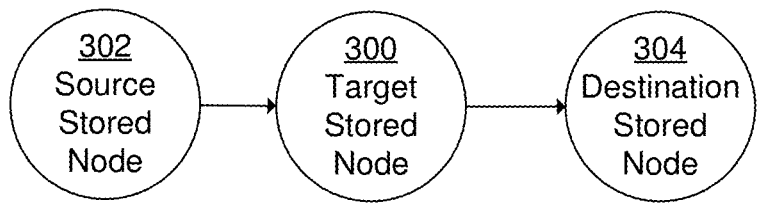
FIG. 3 shows a diagram of data structure with respect to a particular node in accordance with one or more embodiments.

For a particular stored node (i.e., target stored node), the nomenclature of the graph data structure is shown in FIG. 3. Specifically, FIG. 3 shows a diagram of a graph data structure with respect to a target stored node (300) in accordance with one or more embodiments. A target stored node (300) is the current target for processing. For example, during traversal of the graph data structure, the target stored node (300) is the stored node that is currently being processed. The target stored node (300) has one or more source stored nodes (302) and one or more destination stored nodes (304). A source stored node (302) is a stored node that has an edge directly to the target stored node (300). A destination stored node (304) has an edge from the target stored node (300) directly to the destination stored node (304). Thus, the source stored node (302) represents a source of data for the target stored node (300) while the destination stored node (304) represents a destination of data for the target stored node (300). As such edges exist between stored nodes of the graph data structure when the stored node is a direct source of data or a direct destination of data from one stored node to another stored node.

Figure 4:
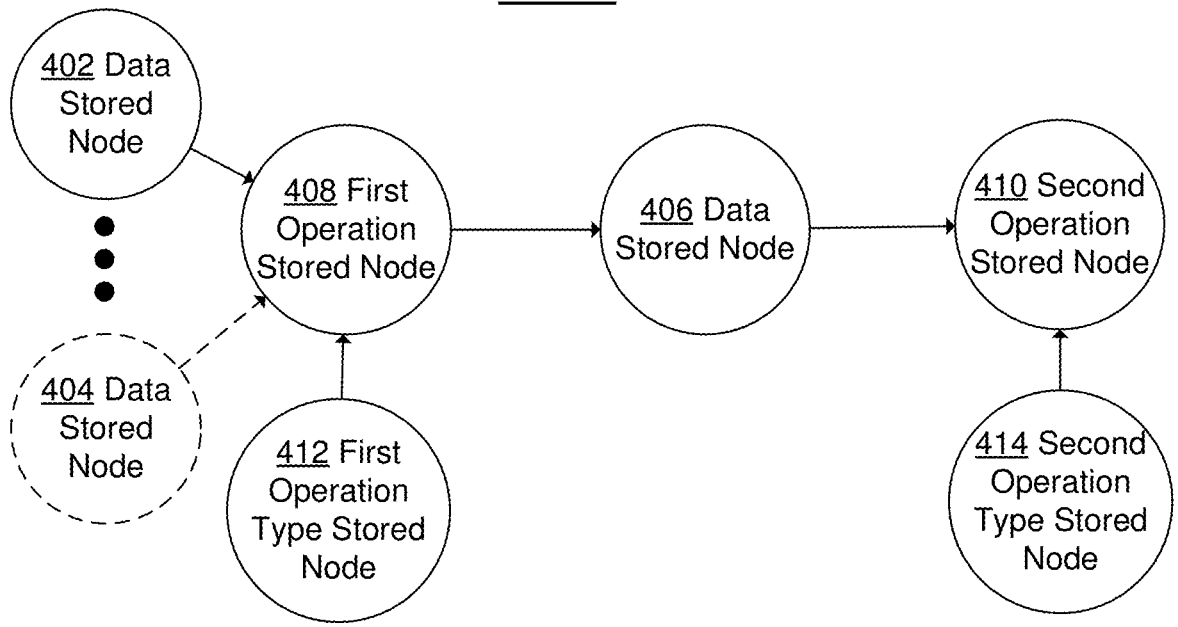
FIG. 4 shows a diagram of a portion of an original graph data structure in accordance with one or more embodiments.

Returning to the original graph data structure, FIG. 4 shows a diagram of a portion of an original graph data structure in accordance with one or more embodiments. As shown in FIG. 4, different kinds of stored nodes exist. Stored nodes may be data stored nodes (402, 404, 406) or operation stored nodes (408, 410). Data stored nodes are stored nodes that represent a data object, such as a variable or a constant. The data object has a datatype. The datatype of the data object may be a simple type (e.g., integer, date, percentage, character, string, etc.) or a complex type (e.g., a structure having multiple simple datatypes). Thus, data stored nodes are labeled with the name of the data object and the datatype. The name may be a unique identifier of the data object and, optionally, a location (e.g., pathname) in which the data object may be found.

Operation stored nodes represent an operation. The operation may be a single action (e.g., a single calculation, such as addition, subtraction, multiplication, concatenation, etc.) or multiple consecutive actions (e.g., as calculated by an underlying function in the code). Operation have an operation type and an operation instance. The operation instance is an instance that the operation is called in the code. The operation type denotes the particular action(s) that is performed by the operation. Thus, operation stored nodes may be labeled with an instance identifier uniquely identifying the operation instance. The operation stored node may also be labeled with a location of the operation (e.g., pathname of the operation).

Multiple operations instances of the same operation type may be in the original graph data structure. For example, if the original graph data structure represents code for performing a financially related task, the multiple instances of a summation operation stored node may exist in the original graph data structure, whereby each instance represents performing summation.

The operation type is stored in an operation type stored node (412, 414) that is connected to the operation stored node (408, 410). The operation type stored node (412, 414) has a label uniquely identifying the operation type of the related operation stored node (408, 410, respectively). Thus, in the summation example, each instance of the operation stored node is connected to an operation type stored node that includes label of summation.

Also, as shown in FIG. 4, data stored nodes (e.g., data stored node (406)) are interposed between operation stored nodes (408, 410) in the original graph data structure. With respect to a particular operation stored node, the data stored node may be an input stored node or an output stored node. For example, data stored nodes (402, 404) are input stored nodes to first operation stored node (408). Further, data stored node (406) is an output stored node to the first operation stored node (408) and an input stored node to second operation stored node (410).

Although not shown in FIG. 4, each stored node in the original graph data structure may be labeled with a unique original graph identifier. The unique original graph identifier is a node identifier that uniquely identifies the stored node within the original graph data structure. For example, the node identifier may be a unique alphanumeric identifier of the stored node.

Returning to FIG. 1, the data repository (100) further includes functionality to store an auxiliary graph data structure (110). The auxiliary graph data structure (110) is a transformed version of the original graph data structure. In the auxiliary graph data structure, the data stored nodes and operation type stored nodes that are in the original graph data structure are removed. The operation stored nodes that are in the original graph data structure are also in the auxiliary graph data structure. An edge connects two operation stored nodes when the output of one operation stored node is the input to the other operation stored node. Thus, like the original graph data structure (108), the auxiliary graph data structure (110) is a directed, acyclic graph whereby the direction of edges represents the flow of data through the code. The edge of the auxiliary graph is referred to as an auxiliary graph edge.

Figure 5:
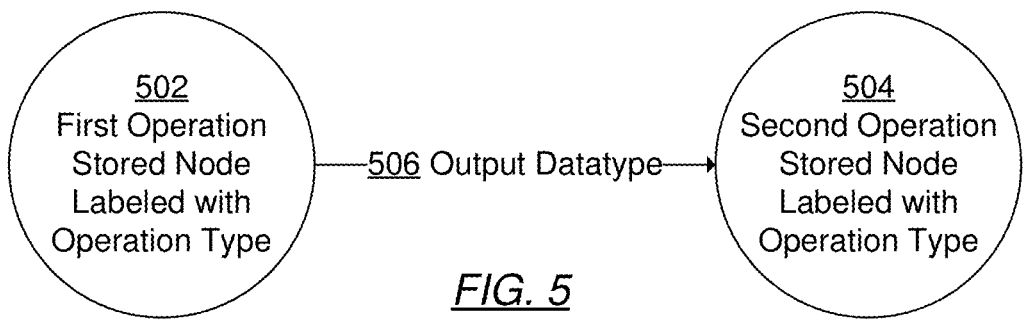
FIG. 5 shows a diagram of a portion of an auxiliary graph data structure in accordance with one or more embodiments.

FIG. 5 shows a diagram of a portion of an auxiliary graph data structure (110) in accordance with one or more embodiments. As shown in FIG. 5, in the auxiliary graph data structure, the operation stored nodes (502, 504) are directly labeled with the operation type. The operation type is the operation type that is defined in the operation type stored node connected to the corresponding operation stored node in the original graph data structure. The edge is labeled with the output datatype (506) from the data stored node that was interposed between the corresponding operation stored nodes. Although not shown in FIG. 5, stored nodes in the auxiliary graph data structure may be labeled with a unique auxiliary graph identifier. The unique auxiliary graph identifier is a node identifier that is unique with respect to the auxiliary graph data structure. Thus, FIG. 5 may be a portion of an auxiliary graph data structure for the portion of the original graph data structure shown in FIG. 4. By transforming the original graph data structure and relabeling stored nodes and edges, the computer processor executing the pattern mining tool is faster in identifying patterns of connected sets of operations in the code that involve the same datatypes.

By way of an example of a storage structure, the auxiliary graph data structure may be stored as a list of sets. Stored nodes in the list of sets have the set structure of: {s identifying the set as a stored node, auxiliary graph unique identifier, numeric label that maps to the operation type, location of the operation}. Edges in the list of sets have the set structure of {e identifying the set as an edge, source stored node auxiliary graph unique identifier, destination stored node auxiliary graph unique identifier, datatype identifier that uniquely identifies the datatype}.

Returning to FIG. 1, the mapping data structure (112) maintains a mapping between unique identifiers in the original graph data structure (108) and to the auxiliary graph data structure (110). Specifically, for each stored node in the auxiliary graph data structure (110) as identified by the unique node identifier, the mapping data structure stores a relationship with the node identifier in the original graph data structure. The mapping data structure may be, for example, a table data structure.

The parameters (114) are parameters for the pattern mining. For example, the parameters may be a minimum number of stored nodes in a pattern, a minimum number of instances of the pattern to list the pattern, or other parameters.

The pattern list (116) is a list of patterns. A pattern is an ordered contiguous set of operation types and datatypes that is present in the original code more than twice. To be identified, the output datatypes and the operation types match the pattern.

By way of an example, consider the simple example in which the original code has a series of operation types that are summation followed by multiplication followed by a comparison. In one occurrence of the series, the output of the summation is a datatype that is a percentage, the output of the multiplication is a datatype that is a number, and the output of the comparison is a datatype that is a Boolean (e.g., yes, or no). In a second occurrence of the series, the output of the summation is a datatype that is a number, the output of the multiplication is a datatype that is a number, and the output of the comparison is a datatype that is a Boolean. Because the first occurrence and the second occurrence have different datatypes (e.g., percentage versus number), the first occurrence and the second occurrence are not instances of a same pattern in one or more embodiments. The above is only a simple example for illustrative purposes. Patterns may be more complex.

Patterns are identified based on satisfying the parameter. Patterns have multiple instances, whereby each pattern instance is an instance or occurrence of the pattern in the auxiliary graph data structure, and correspondingly, in the original graph data structure and original code.

Within the auxiliary graph data structure and the original graph data structure, each instance of the pattern is a connected sub-graph. The connected sub-graph may be a sequence of operations (i.e., instances are each a single branch or portion thereof), a connected set of operations having a common root (i.e., instances are each a subtree of the subgraph), or a connected set of operations having multiple roots (i.e., instances are each a subgraph with multiple root stored nodes and one or more leaf stored nodes in the subgraph).

Patterns may be nested. Specifically, within a single instance of a first pattern, multiple instances of a sub-pattern may exist. The pattern and the sub-pattern may be identified.

Similarly, patterns may overlap. Namely, one or more instances of a pattern may overlap with one or more instances of another pattern. Overlapping patterns and instances occur when a portion of the nodes of one pattern are the same as a portion of the nodes of another pattern. One or more embodiments may use a set of rules to determine whether to consolidate overlapping patterns. For example, the set of rules may be that a percentage of instances of each pattern having the overlap as compared to instances not having the overlap exceeds a threshold.

Instance identifiers (118) identify instances of the pattern in the auxiliary graph data structure (110) and, correspondingly, in the original graph data structure. Each instance identifier may be a set of unique auxiliary graph identifiers of the stored nodes in the instance. As another example, the instance identifier may be the set of unique original graph identifiers of the stored nodes in the instance. Instance identifiers may also be labeled with a name for the instance, such as a number of the instance.

A code optimization application (102) is communicatively connected to the data repository (100). The code optimization application (102) is configured to execute on a computing device, such as the computing device shown in FIGS. 14A and 14B. The code optimization application (102) includes an original graph generator (120), a code analyzer (122), and a code optimizer (124). The original graph generator (120) is a software program configured to generator an original graph data structure (108) from the original code (104). The code analyzer (122) is configured to identify and present instances of patterns in the original code (104). The code optimizer (124) is configured to modify the original code (104) and create revised code (106) based on the instances. The modification may be to create a new function for at least a portion of the instances of a same pattern, and then add a call at each instance to the new function. As another example, the modification may be to individually modify at least a subset of the instances based on the identification (e.g., to remove a security threat).

The code analyzer (122) includes a graph transformation tool (126), a pattern mining tool (128), a pattern finder tool (130), and a visualization tool (132). The graph transformation tool (126) is a program that is configured to generate the auxiliary graph data structure (110) from the original graph data structure (108). The pattern mining tool (128) is a program that is configured to mine the auxiliary graph data structure (110) to identify patterns. In one or more embodiments, the output of the pattern mining tool (128) is the pattern list (116). For example, the output may be a single instance of each pattern found in the auxiliary graph data structure (110). In one or more embodiments, the pattern mining tool (128) is a third-party tool. The third-party pattern mining tool may be on the same computing device or different computing device as the code optimization application (102). In such a scenario, the code analyzer (122) is configured to issue a request to the third-party pattern mining tool to obtain the pattern list (116). The pattern mining tool (128) is further configured to identify patterns based on parameters (114). The pattern finder tool (130) is configured to identify instances of patterns in the pattern list (116).

The visualization tool (132) is configured to present the instances of the patterns. Presenting the instances of the patterns may be to transfer the list of the instances. As another example, presenting the instances may be to graphically highlight instances in a graphical user interface displaying the original code (104). As another example, presenting the instances may be to graphically show the instances in the original graph data structure (108).

While FIGS. 1-5 shows a configuration of components, other configurations may be used without departing from the scope of the invention. For example, various components may be combined to create a single component. As another example, the functionality performed by a single component may be performed by two or more components.

Figure 6:
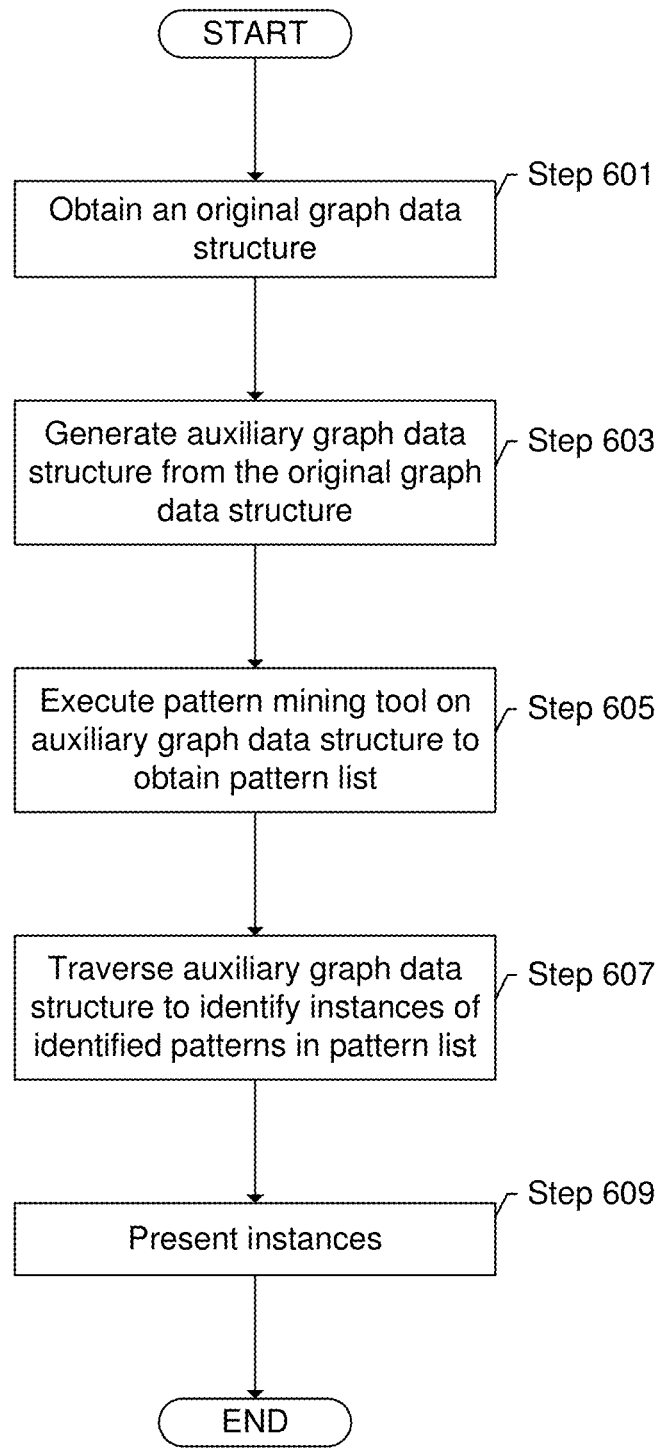
FIG. 6 shows a flowchart for generating a storage structure for pattern mining and performing pattern mining in accordance with one or more embodiments.

FIG. 6 shows a flowchart for generating a storage structure for pattern mining and performing pattern mining in accordance with one or more embodiments. In Step 601, an original graph data structure is obtained. The original graph generator traverses the original code. For each call to an operation, the original graph generator generates an operation stored node and an operation type stored node. For each data object in the code, the original graph generator generates a data stored node. The original graph generator also connects the nodes. In one or more embodiments, the operations of FIG. 6 is performed through static analysis of the code. Further, the code may be free of loops in one or more embodiments. If the code has loops, the graph may have cycles and the pattern mining is performed a directed graph with cycles.

In Step 602, an auxiliary graph data structure is generated from the original graph data structure. To generate the auxiliary graph data structure, the original graph data structure is traversed, such by using depth first traversal or other traversal mechanism. During traversal, the operation stored nodes that are in the original graph data structure are added to the auxiliary graph data structure. As part of adding the operation stored nodes, the edges to the operation type stored nodes are traversed to obtain a label for the operation stored nodes in the auxiliary graph data structure. Data stored nodes that are root or leaf stored nodes are ignored and not added. When adding the operation stored nodes, a data stored node and at least two edges connecting the data stored nodes to destination stored nodes is replaced by at least one edge labeled with the datatype of the data stored node. The transitive property is applied to line the edges. Thus, for example, if operation stored node A is connected to a data stored node, which is then connected to operation stored node B and operation stored node C, then applying the transitive property creates two edges in the auxiliary graph data structure. One of the two edges is from operation stored node A to operation stored node B and the other from operation stored node A to operation stored node C. Both new edges are labeled with the datatype identifier of intervening data stored node in the original graph data structure. Thus, after generation, the auxiliary graph data structure has only operation stored nodes that are labeled with operation type identifier are connected by edges labeled with data type identifiers.

In Step 605, pattern mining tool is executed on the auxiliary graph data structure to obtain a pattern list. The code analyzer may issue a request to the pattern mining tool with the parameters and the auxiliary graph data structure. Because the auxiliary graph data structure is an optimized version of the original graph data structure, mining for patterns is executed faster and with less memory requirements. Pattern mining may also be referred to as frequent subgraph mining (FSM). FSM is the process by which a computer identifies (i.e., mines) subgraphs that appear frequently in a large graph. "Frequently" is defined by the minimum threshold parameter as an integer t. In general, the FSM problem is formulated in the following two settings: Either, given a collection of graphs C and a threshold t, find all the subgraphs that appear in at least t graphs in C; or, given a graph G and a threshold t, find all the subgraphs that appear at least t times in G.

The problem of identifying frequent subgraphs in a large graph data structure reduces to two main steps: Generate the candidates; and Check the candidates frequency. The second step is subgraph isomorphism, an NP-hard problem. To perform the first step, a solution mines, using breadth first search, subgraphs of size k−1 in order to mine subgraphs of size k. This may cause many duplicate candidates and a large number of false positives. Another technique for the first step is through pattern growth. In pattern growth, breath first search or depth first search are used by extending a pattern by an edge (backward or forward) and check against the new pattern. Grami and gSpan are both third party pattern mining tools that may be used for pattern mining on the auxiliary graph data structure.

In Step 607, the auxiliary graph data structure is traversed to identify instances of the identified patterns in the pattern list. Depth first search or breath first search traversal may be used to match stored nodes to patterns. When the set of stored nodes matching a pattern are identified, the auxiliary graph unique identifiers of the set of stored nodes are added to a stored set for the instance. Using the mapping data structure, the auxiliary graph unique identifiers are mapped to the original graph unique identifiers. Thus, a stored instance identifier may include the original graph unique identifiers for each instance as well as a pattern identifier for the pattern matched by the instance. Additionally, in one or more embodiments, the stored nodes include labels that identify the locations of the underlying operations and data objects in the original code. Thus, the instance identifier also identify the instance in the original code.

In Step 609, the instances are presented. Presenting the instances may be to transmit the instances to another program (e.g., to a code optimizer) or to display the instances in the visualization tool. Based on the presentation, the original code may be revised to create revised code. For example, one technique is to create a pattern function for an identified pattern. Each instance in the original code matching the pattern may be replaced with a call or reference to the pattern function. Thus, from the original graph data structure perspective, the original graph data structure is collapsed by consolidating a pattern into a pattern stored node. The pattern stored node is an operation stored node that has an operation type node identifying the operation type as the pattern function. The pattern function maintains the operations of the pattern. At least a subset of the instances corresponding to the pattern are replaced with the pattern stored node.

Figure 7:
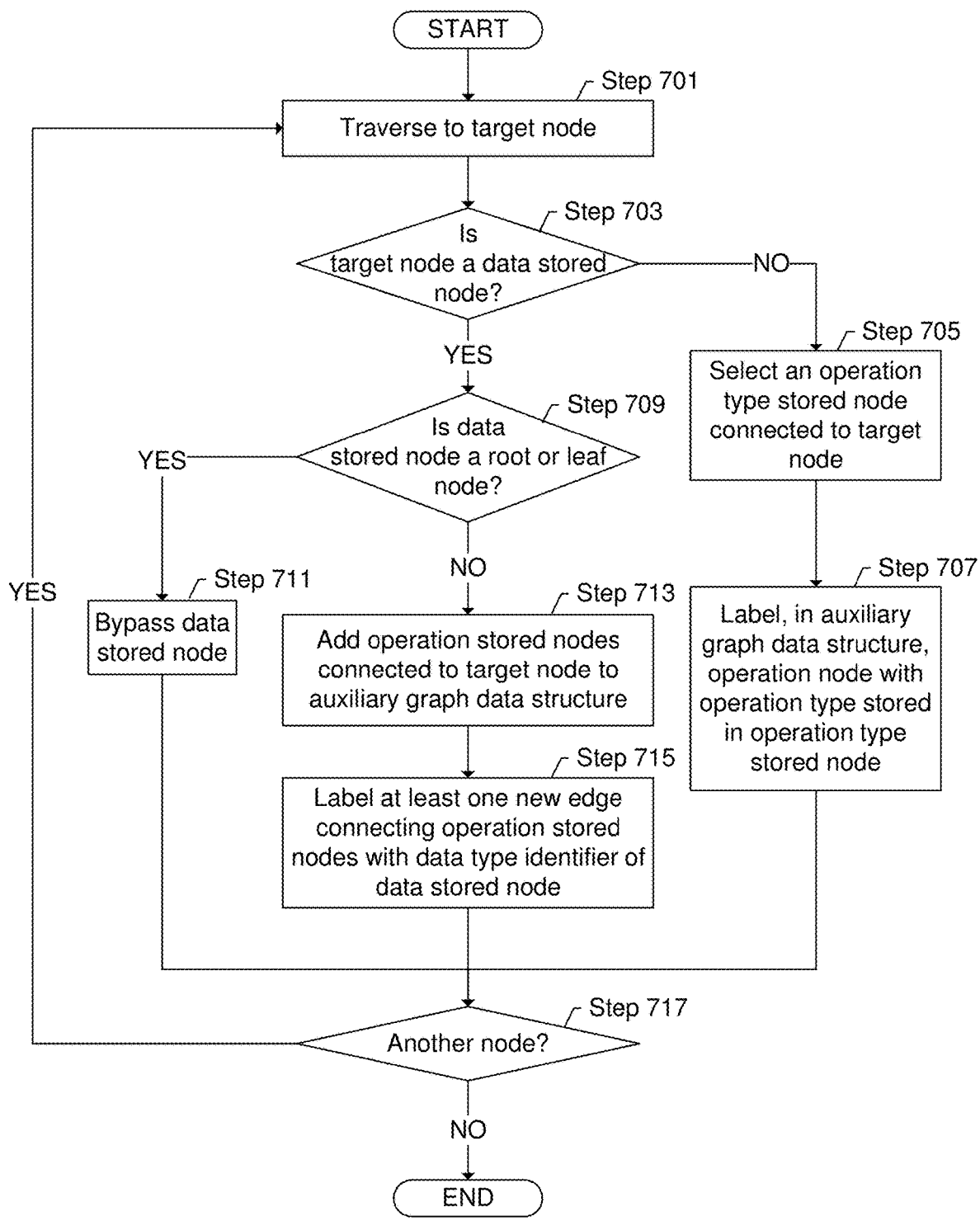
FIG. 7 shows a flowchart for generating an auxiliary graph data structure in accordance with one or more embodiments.

FIG. 7 shows a detailed flowchart for generating an auxiliary graph data structure in accordance with one or more embodiments. In Step 701, the graph transformation tool traverses to a target node. In Step 703, a determination is made whether the target stored node is a data stored node. If the target stored node is not a data stored node, then the target stored node may be an operation stored node and the flow proceeds to Step 705. In Step 705, the operation type stored node directly connected to the operation node (i.e., the target node) is selected. If the operation stored node is not already in the auxiliary graph data structure, the operation stored node is added to the auxiliary graph data structure. The operation stored node is labeled in Step 707 with the operation type identifier of the operation type in the operation type stored node. Then, the flow proceeds to Step 717 to determine whether another unprocessed stored node exists.

Returning to Step 703, if the target stored node is a data stored node, the flow proceeds to Step 709 to determine whether the data stored node is a root or leaf node. If the data stored node is a root or leaf node, then the data stored node is bypassed, or ignored, in Step 711 without further processing and the flow proceeds to Step 717.

If the data stored node is not a root or leaf stored node, then the flow proceeds to Step 713. In Step 713, if not already in the auxiliary graph data structure, the operation stored nodes connected to the target stored node is added to the auxiliary graph data structure. The target stored node becomes one or more edges in the auxiliary graph data structure. In particular, each source stored node to the target stored node is connected by a new edge to each destination stored node of the target stored node. The new edge is labeled with the datatype identifier of the target stored node.

Continuing with FIG. 7, after adding the new edges, the flow proceeds to Step 717 to determine whether another unprocessed stored node in the original graph data structure exists. If so, the flow proceeds to Step 701. If not, the flow proceeds to end.

One or more embodiments may be used for a series of calculations as defined in a calculation graph ("Calc graph"). The Calc graph is a collection of atomic operations abstracted in gists, which are operation stored nodes for one or more actions. Various sequences of operations are repeated over and over again. Each sequence is represented as a subgraph in the Calc graph. Automating the construction of the Calc graph is efficient but results in a verbose representation.

Calc graphs may be used for tax calculations. Specifically, tax experts input new modifications to the tax code by copy/pasting existing calculations into code and correspondingly calc graphs. A goal of one or more embodiments is to identify repeated Calc subgraphs to encapsulate them into slightly bigger gists. The new gists should not encapsulate lots of calculations in order to not jeopardize explanation.

By way of an example, a common calculation has the form $Z=k \% X-Y$, whereby a percentage (k) of some value X is calculated to produce a first result, and some limit (Y) is deducted from the first result. In the original graph data structure, each instance of the calculation is a subgraph. To revise the code, the n subgraphs generated by the calculations can be encapsulated by introducing a new gist, call it for instance percentage_limit.

Identifying repeated calcs (patterns in the original graph data structure) allows for easy maintenance, reduced storage size, increased development and runtime speed. In terms of easy maintenance, the tax code changes constantly, therefore the Calc graph needs to be updated with each new change. Finding the repeatable patterns and reducing the repeatable patterns to a single gist will allow for updating the gist once and once only. With respect to storage, atomic calculations allow for easy generation of the graph data structure, but the graph data structure ends up being verbose and unnecessarily large. By reducing the instances of the pattern to a single gist, the overall size of the graph data structure is reduced. With respect to development and runtime speed, less time is spent to instantiate the new gist than to build the full subgraph, and runtime speed is increased because the tax engine is smaller since the underlying graph is smaller.

FIGS. 8, 9, 10, 11, 12, and 13 show an example in accordance with one or more embodiments. Specifically, FIG. 8-13 show an example for program code configured to calculate taxes due according to the Canadian tax code. As part of the calculation of taxes, the program code calculates TONI tables in the Canadian tax code.

The TONI table is a table in Canadian forms that calculates the tax on a taxable income based on income brackets. The table (800) in FIG. 8 is from the Alberta (AB) province, which has 5 income brackets, each with a different tax percentage. Each column (802, 804, 806, 808, 810) in the table below corresponds to an income tax bracket. The TONI tables are calculated in the program code (i.e., original code) as a separate calculation for each column's comparison function, subtraction, multiplication, and addition operation.

Figure 9:
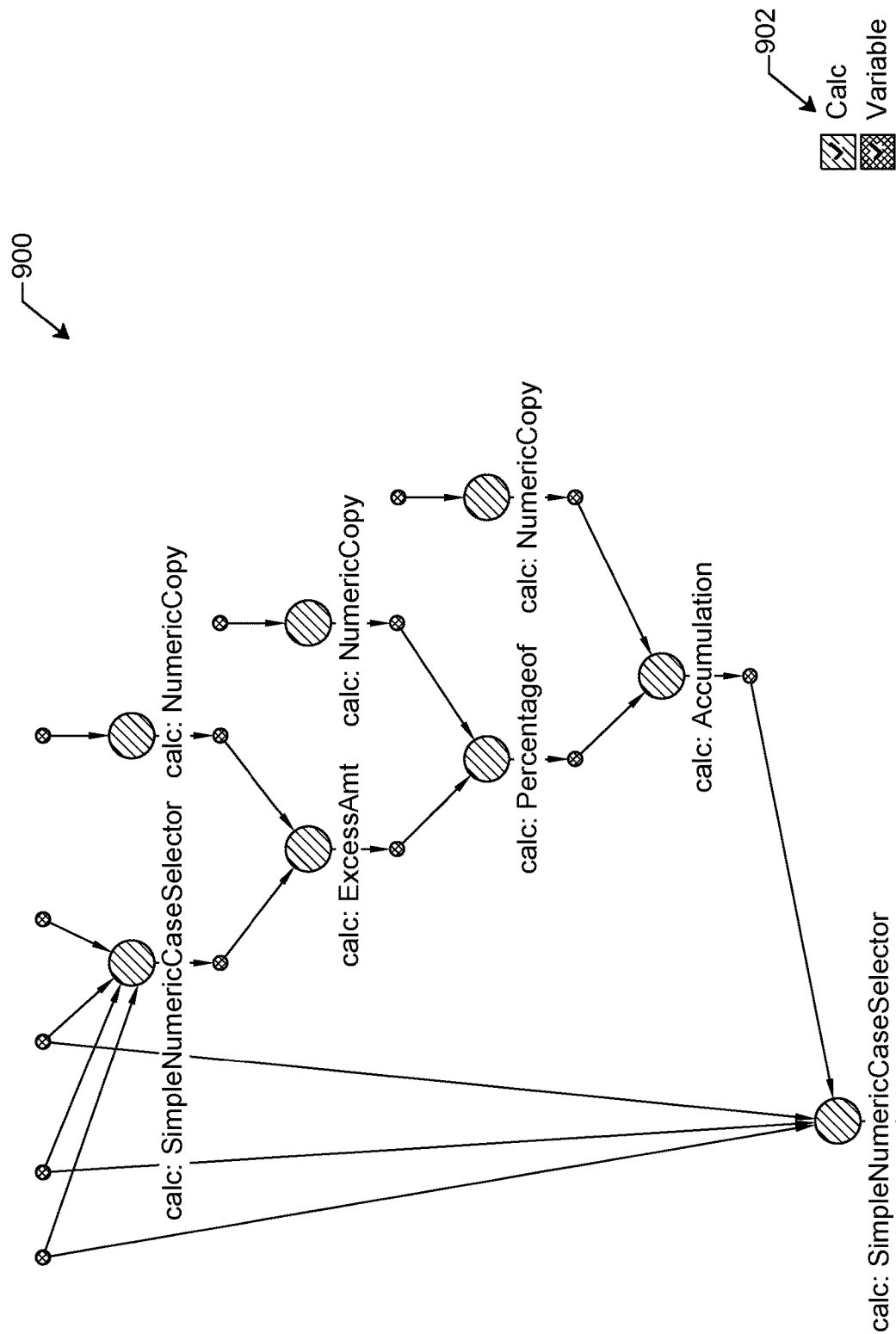

Each column is individually represented in the original graph data structure with the graph (900) illustrated in FIG. 9. As shown in FIG. 9 by key (902), some of the stored nodes are data stored nodes and some of the stored nodes are operation stored node. Operation type stored nodes are not shown for simplifying the figure. For the single Alberta form above, 5 copies of this subgraph exist in the Canadian Tax Calc graph. Similar to the AB form, the British Columbia subgraphs follow the same structure, but with 6 columns as shown in FIG. 10. In fact, across all provinces and territories (13 in total), the TONI table follows the same structure. More than just the TONI tables are present in the Canadian tax code. Accordingly, the program code, and correspondingly, the original graph data structure, is significantly larger than shown in FIG. 9 and cannot be illustrated on a drawing page.

Figure 11:

By modifying the original graph data structure for the calculation graph of the Canadian tax into an auxiliary graph data structure, and then using the auxiliary graph data structure to a pattern mining tool, the pattern in the columns of the TONI tables are identified. FIG. 11 shows the pattern in a portion of the auxiliary graph data structure. Specifically, FIG. 11 shows a subgraph (1100) of the original graph data structure. The subgraph corresponds to the identified portion.

Figure 12:
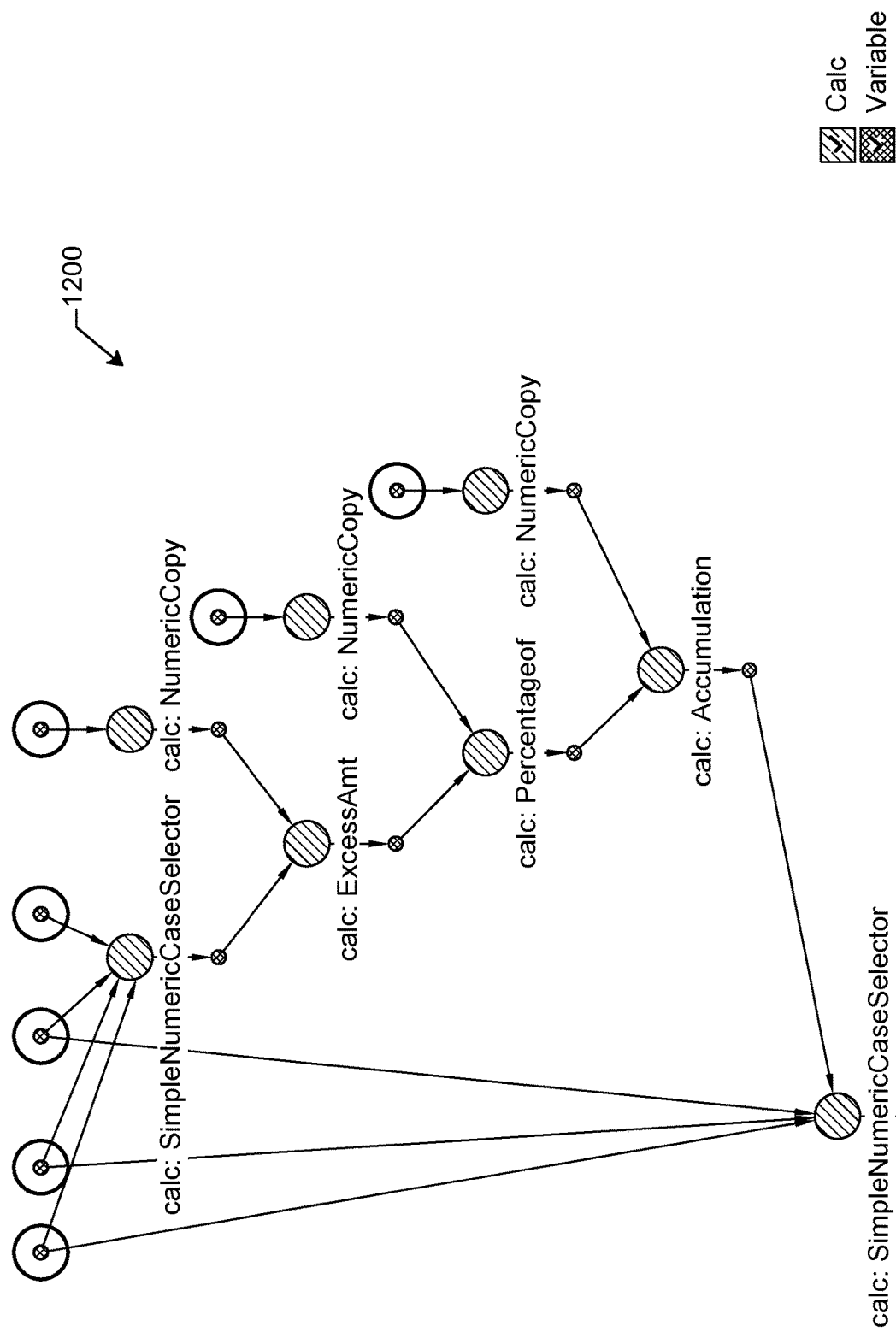

FIG. 12 shows a hierarchical view of an instance (1200) of the pattern in the original graph data structure that is mapped to the instance shown in FIG. 11. Continuing with the example, instead of having the subgraph repeated (13 provinces & territories x average of 5 columns) 65 times, the code optimizer can create one gist (i.e., pattern stored node), called TONI_gist as the operation type identifier. The TONI_gist takes as input the various variables that are the roots of the subgraph shown in FIG. 12 and output the leaf stored node of the subgraph of FIG. 12.

Figure 13:
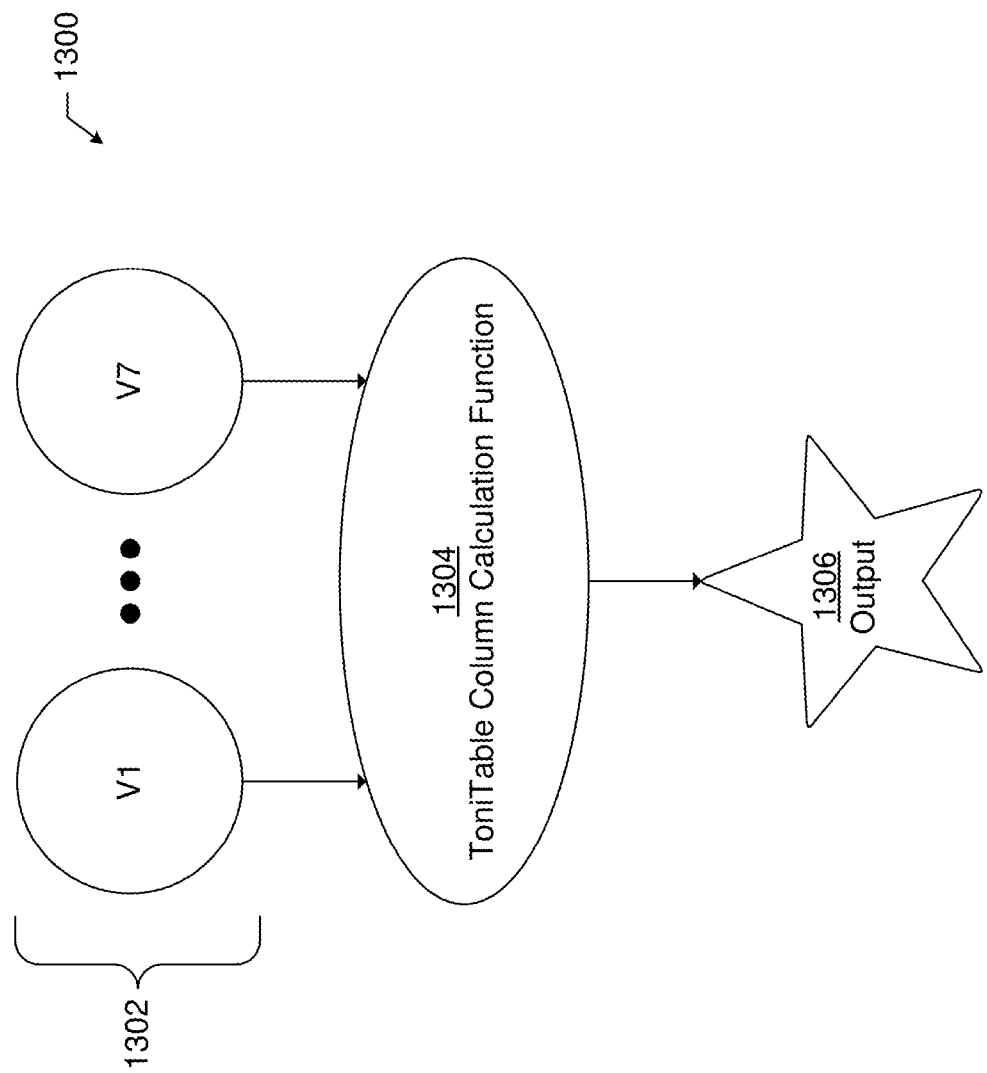

The result is a revised code shown by a revised graph data structure in FIG. 13. In FIG. 13, input variables v1-v7 (1302) are used as input to a new function ("TONITable Column Calculation Function") (1304) to produce output (1306). By simplifying the original graph data structure, the pattern in the column of the TONI table may be identified by the processor and the program code for the Canadian Tax Code is greatly reduced.

Figure 14A:
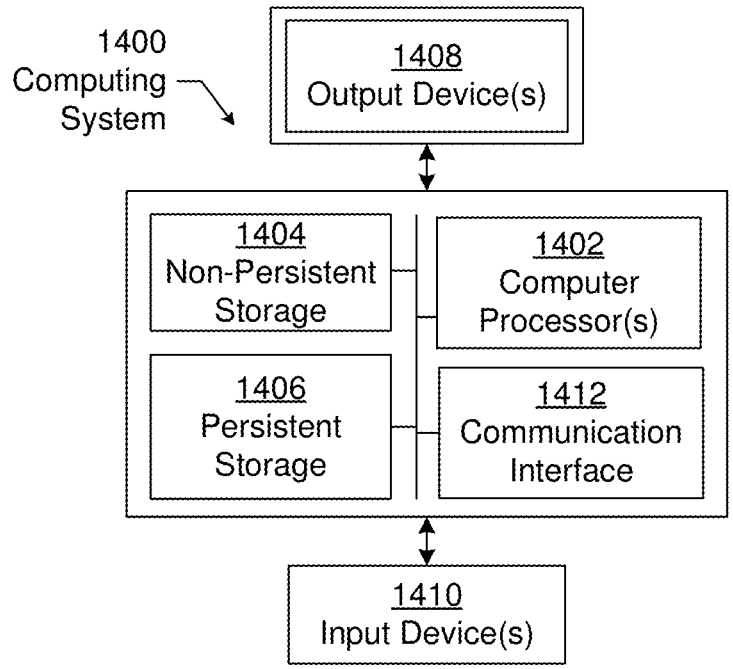
FIGS. 14A and 14B show a computing system in accordance with one or more embodiments of the invention.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 14A, the computing system (1400) may include one or more computer processors (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities that implement the features and elements of the disclosure.

The computer processor(s) (1402) may be an integrated circuit for processing instructions. For example, the computer processor(s) may be one or more cores or micro-cores of a processor. The computing system (1400) may also include one or more input devices (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output devices (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 14B:
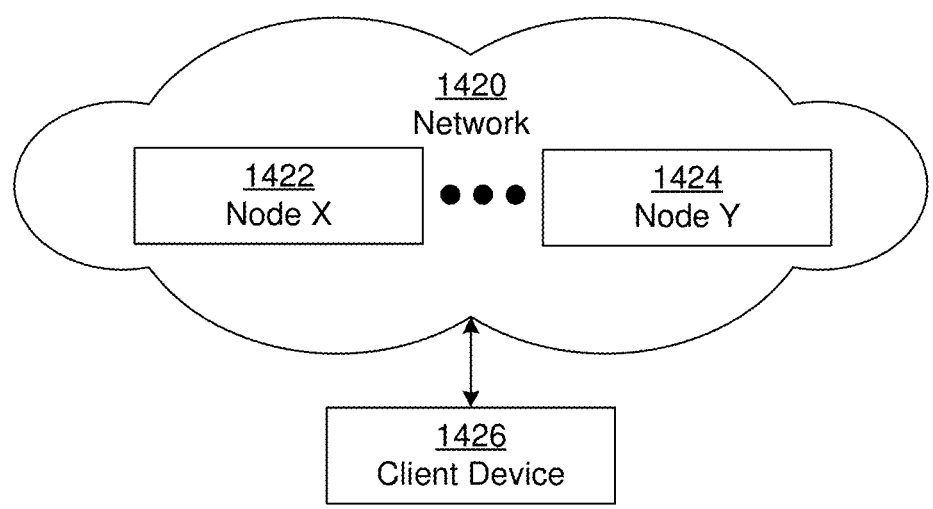

The computing system (1400) in FIG. 14A may be connected to or be a part of a network. For example, as shown in FIG. 14B, the network (1420) may include multiple nodes (e.g., node X (1422), node Y (1424)). Each node may correspond to a computing system, such as the computing system shown in FIG. 14A, or a group of nodes combined may correspond to the computing system shown in FIG. 14A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1400) may be located at a remote location and connected to the other elements over a network.

Although not shown in FIG. 14B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1422), node Y (1424)) in the network (1420) may be configured to provide services for a client device (1426). For example, the nodes may be part of a cloud computing system. The nodes may include functionality to receive requests from the client device (1426) and transmit responses to the client device (1426). The client device (1426) may be a computing system, such as the computing system shown in FIG. 14A. Further, the client device (1426) may include and/or perform all or a portion of one or more embodiments of the invention.

The computing system or group of computing systems described in FIGS. 14A and 14B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 14A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 14A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 14A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 14A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 14A and the nodes and/or client device in FIG. 14B. Other functions may be performed using one or more embodiments of the invention.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Thus, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
obtaining an original graph data structure comprising a plurality of stored nodes connected by a plurality of edges, the plurality of stored nodes comprising a plurality of operation stored nodes and a plurality of data stored nodes;

generating an auxiliary graph data structure from the original graph data structure, wherein generating the auxiliary graph data structure comprises:
  adding, from the original graph data structure, the plurality of operation stored nodes to the auxiliary graph data structure while traversing the original graph data structure, and
  replacing, when adding the plurality of operation stored nodes, a data stored node and at least two edges connecting the data stored node to at least two operation stored nodes with at least one new edge;
executing a pattern mining tool on the auxiliary graph data structure to obtain a pattern list;
traversing the auxiliary graph data structure to identify a plurality of instances of identified patterns in the pattern list; and
presenting the plurality of instances.

2. The computer implemented method of claim 1, further comprising:
  labelling the at least one new edge with a datatype identifier in the data stored node.

3. The computer implemented method of claim 1, wherein adding the plurality of operation stored nodes comprises:
  selecting, when traversing the original graph data structure, an operation type stored node connected to an operation stored node in the original graph data structure, wherein the operation stored node is in the plurality of operation stored nodes; and
  labeling, in the auxiliary graph data structure, the operation stored node with an operation type listed in the operation type stored node.

4. The computer implemented method of claim 1, further comprising:
  mapping the plurality of instances from the auxiliary graph data structure into the original graph data structure,
  wherein presenting the plurality of instances comprises presenting the plurality of instances in the original graph data structure.

5. The computer implemented method of claim 1, wherein the plurality of operation stored nodes in the original graph comprise a unique original graph identifier, wherein generating the auxiliary graph data structure comprises:
  for each operation stored node in the auxiliary graph data structure,
    assigning a unique auxiliary graph identifier to the operation stored node, and
    adding, to a mapping data structure, a reference from the unique auxiliary graph identifier to the unique original graph identifier.

6. The computer implemented method of claim 1, further comprising:
  collapsing the original graph data structure by:
    consolidating a pattern into a pattern stored node, and
    replacing a subset of the plurality of instances corresponding to the pattern with the pattern stored node.

7. The computer implemented method of claim 1, wherein generating the auxiliary graph data structure further comprises:
  bypassing, without adding to the auxiliary graph data structure, any of the plurality of data stored nodes that are a root node or a leaf node in the original graph data structure.

8. The computer implemented method of claim 1, further comprising:
  presenting the plurality of instances in a visualization tool.

9. A system comprising:
a storage device storing:
  an original graph data structure comprising a plurality of stored nodes connected by a plurality of original graph edges, the plurality of stored nodes comprising a plurality of operation stored nodes and a plurality of data stored nodes, and
  an auxiliary graph data structure comprising:
    the plurality of operation stored nodes labeled with an operation type and connected by a plurality of auxiliary graph edges,
    the plurality of auxiliary graph edges each labeled with a datatype identifier of corresponding data stored node of the plurality of data stored nodes; and
at least one computer processor executing a code optimization application, the code optimization application comprising:
  a graph transformation tool configured to generate the auxiliary graph data structure from the original graph data structure.

10. The system of claim 9, wherein the code optimization application is further configured to execute a pattern mining tool to obtain a pattern list.

11. The system of claim 10, wherein the code optimization application further comprises:
  a pattern finder tool configured to traverse the auxiliary graph data structure to identify a plurality of instances of identified patterns in the pattern list.

12. The system of claim 11, wherein the code optimization application further comprises:
  a visualization tool configured to present the plurality of instances.

13. The system of claim 9, wherein the at least one computer processor is further configured to execute:
  a code optimizer configured to optimize original code and create revised code using a plurality of instances of patterns identified in the auxiliary graph.

14. The system of claim 9, wherein the storage device is further configured to store:
  a mapping data structure that maps a plurality of instances of patterns in the auxiliary graph data structure into the original graph data structure.

15. The system of claim 9, wherein the plurality of operation stored nodes in the original graph comprise a unique original graph identifier, wherein generating the auxiliary graph data structure comprises:
  for each operation stored node in the auxiliary graph data structure,
    assigning a unique auxiliary graph identifier to the operation stored node, and
    adding, to a mapping data structure, a reference from the unique auxiliary graph identifier to the unique original graph identifier.

16. A computer implemented method comprising:
generating an auxiliary graph data structure from an original graph data structure,
  the original graph data structure comprising a plurality of stored nodes connected by a plurality of original graph edges, the plurality of stored nodes comprising a plurality of operation stored nodes and a plurality of data stored nodes, and
  the auxiliary graph data structure comprising:
    the plurality of operation stored nodes labeled with an operation type and connected by a plurality of auxiliary graph edges, the plurality of auxiliary graph edges each labeled with a datatype identifier of corresponding data stored node of the plurality of data stored nodes; and executing a pattern mining tool on the auxiliary graph data structure to obtain a pattern list;

identifying a plurality of instances of identified patterns in the pattern list; and presenting the plurality of instances.

17. The computer implemented method of claim 16, further comprising:

mapping the plurality of instances from the auxiliary graph data structure into the original graph data structure, wherein presenting the plurality of instances comprises presenting the plurality of instances in the original graph data structure.

18. The computer implemented method of claim 16, wherein the plurality of operation stored nodes in the original graph comprise a unique original graph identifier, wherein generating the auxiliary graph data structure comprises:

for each operation stored node in the auxiliary graph data structure, assigning a unique auxiliary graph identifier to the operation stored node, and adding, to a mapping data structure, a reference from the unique auxiliary graph identifier to the unique original graph identifier.

19. The computer implemented method of claim 16, further comprising:

collapsing the original graph data structure by:

consolidating a pattern into a pattern stored node, and replacing a subset of the plurality of instances corresponding to the pattern with the pattern stored node.

20. The computer implemented method of claim 16, further comprising:

optimizing code represented the original graph data structure using the plurality of instances.

* * * * *